Oct. 16, 1962  R. C. MULREADY  3,058,303
LIQUID ROCKET PROPELLANT UTILIZATION CONTROL
Filed June 15, 1959  2 Sheets-Sheet 2

INVENTOR
RICHARD C. MULREADY
BY Vernon F. Hauschild
ATTORNEY

United States Patent Office 3,058,303
Patented Oct. 16, 1962

3,058,303
LIQUID ROCKET PROPELLANT UTILIZATION
CONTROL
Richard C. Mulready, Jupiter, Fla., assignor to United
Aircraft Corporation, East Hartford, Conn., a corporation of Delaware
Filed June 15, 1959, Ser. No. 820,450
5 Claims. (Cl. 60—35.6)

This invention relates to liquid rockets and more particularly to the propellant utilization control used therewith.

It is an object of this invention to teach a propellant utilization control for liquid rockets wherein the fuel and the oxidizer are provided to the rocket combustion chamber at the desired oxidizer-to-fuel ratio to insure efficient combustion within the rocket combustion chamber and so that all of the fuel and all of the oxidizer have been utilized at the end of the phase of rocket operation for which they are intended.

It is a further object of this invention to provide a propellant utilization control for liquid rockets to perform the above function including electrical means which provide an electrical signal representative of the ratio of the quantity of fuel and oxidizer remaining in their respective tanks during liquid rocket operation and compares the ratio of remaining liquids to an electrical signal representative of desired fuel-to-oxidizer ratio flow to the rocket combustion chamber to provide a fuel-to-oxidizer ratio error which is used to vary the flow of either the fuel or oxidizer to the combustion chamber to re-establish the desired fuel-to-oxidizer ratio.

Other objects and advantages will be apparent from the specification and claims and from the accompanying drawings which illustrate an embodiment of the invention.

Figure 1:
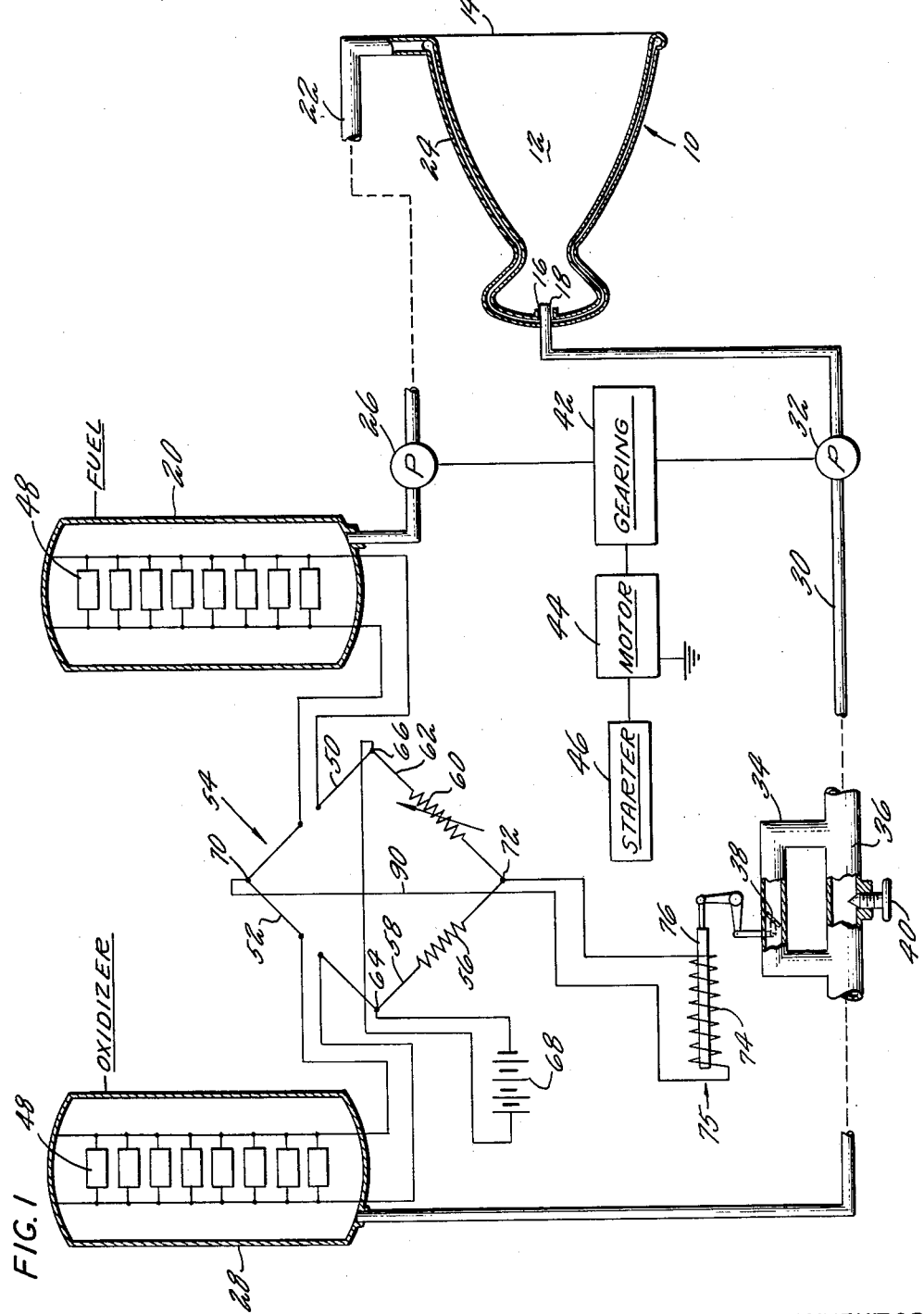
FIG. 1 is a schematic representation of my liquid rocket propellant utilization control employing a resistance bridge circuit.

Referring to FIG. 1 we see liquid rocket 10 including combustion chamber 12, combustion chamber outlet to atmosphere 14, fuel inlet 16 and oxidizer inlet 18. Fuel tank 20 is connected to rocket fuel inlet 16 by first conduit means 22, including fuel regenerative passages 24 in the walls of liquid rocket 10 and having pump 26 positioned therein to pump selected quantities of fuel therethrough. Oxidizer tank 28 is connected to rocket oxidizer inlet 18 through second conduit means 30, which has oxidizer pump 32 and parallel passages 34 and 36 therein, the oxidizer flow therethrough being governed by variable area valve 38 and adjustable valve 40, respectively. Valves 38 and 40 define area flow through passages 34 and 36 and hence they regulate the quantity of oxidizer flow which pump 32 is able to pump through line 30 and into rocket combustion chamber 12. It will be obvious that valves 38 and 40 could as well have been placed in fuel line 22 or downstream of pumps 26 or 32. Further, if tanks 20 and 28 are pressurized, pumps 26 and 32, motor 44 and starter 46 will not be needed.

Prior to rocket operation, selected quantities of fuel, for example hydrogen, and oxidizer are placed in fuel tank 20 and oxidizer tank 28, respectively, in proportion to the desired fuel-to-oxidizer ratio selected for optimum rocket combustion chamber efficiency. Pumps 26 and 32 are connected through gearing 42 and driven by motor 44, which may be an electrical motor energized by starter switch 46, a turbine or other drive means. Gearing 42 is selected to drive pumps 26 and 32 at the speed required so that the fuel flow through inlet 16 and the oxidizer flow through inlet 18 give the desired fuel-to-oxidizer ratio. Due to the fact that wear, machining errors and other factors affect the operation of pumps 26 and 32, it is deemed desirable to incorporate a propellant utilization control into my rocket propellant system to insure that fuel and oxidizer are provided to the combustion chamber of the rocket at all times at the desired fuel-to-oxidizer ratio. Accordingly, electrical means are taught herein to continuously determine the amount of oxidizer remaining in tank 28 and the amount of fuel remaining in tank 20 during the operation of pumps 26 and 32 and compare the electrical signal representing the ratio of the remaining fuel and oxidizer to an electrical signal corresponding to the desired fuel-to-oxidizer ratio to generate a desired fuel-to-oxidizer ratio error signal and then utilize this error signal to vary either the flow or fuel or oxidizer to rocket combustion chamber 12 to re-establish the desired fuel-to-oxidizer ratio.

FIG. 1 shows electrical resistance means accomplishing the above-recited function, namely, temperature sensitive resistance elements 48 are positioned around fuel tank 20 and oxidizer tank 28 and provide a resistance signal to legs 50 and 52, respectively, of bridge circuit 54, which electrical signals from tanks 20 and 28 are proportional to the quantities of fuel and oxidizer remaining therein, respectively, since the propellants are preferably cryogenic and hence cold in liquid form. Carbon or any other type of temperature sensitive resistance elements may be used as members 48, but it should be borne in mind that all temperature sensitive resistance elements do not respond to temperature variation in the same fashion. Fixed resistance 56 is placed in leg 58 of bridge circuit 54 while a variable or trimmer resistance 60 is placed in leg 62 of bridge circuit 54. Resistances 60 and 56 are selected to represent a resistance ratio equal to the desired fuel-to-oxidizer ratio and may be called the desired resistance ratio. With voltage imposed across terminals 64 and 66 of bridge circuit 54 from power source 68, bridge circuit 54 will be in balance when the desired resistance ratio is equal to the actual resistance ratio being provided to legs 50 and 52 as a function of the fuel and oxidizer remaining in tanks 20 and 28, respectively, by temperature sensitive elements 48. When the desired and actual resistance ratios are unequal, current will flow between terminals 70 and 72 through coil 74 of solenoid 75 to actuate solenoid plunger 76 and hence vary the area of variable area valve 38 in line 34 to thereby vary the rate of oxidizer flow through conduit 30 as a function of said ratio error to re-establish the desired fuel-to-oxidizer raito flow to rocket combustion chamber 12.

Solenoid 75 is of the proportional and dual directional type, that is, the amount and direction of movement of plunger 76 is responsive to the amount and direction of current flow therethrough.

If a unidirectional solenoid is used, it will be advisable to bias, for example, the desired resistance ratio (60/56) or the pump flow output ratio (26/32) to insure operation of bridge circuit 54 in a range removed from the balanced circuit and to employ a rectifier therein to insure unidirectional current flow through the solenoid.

Figure 2:
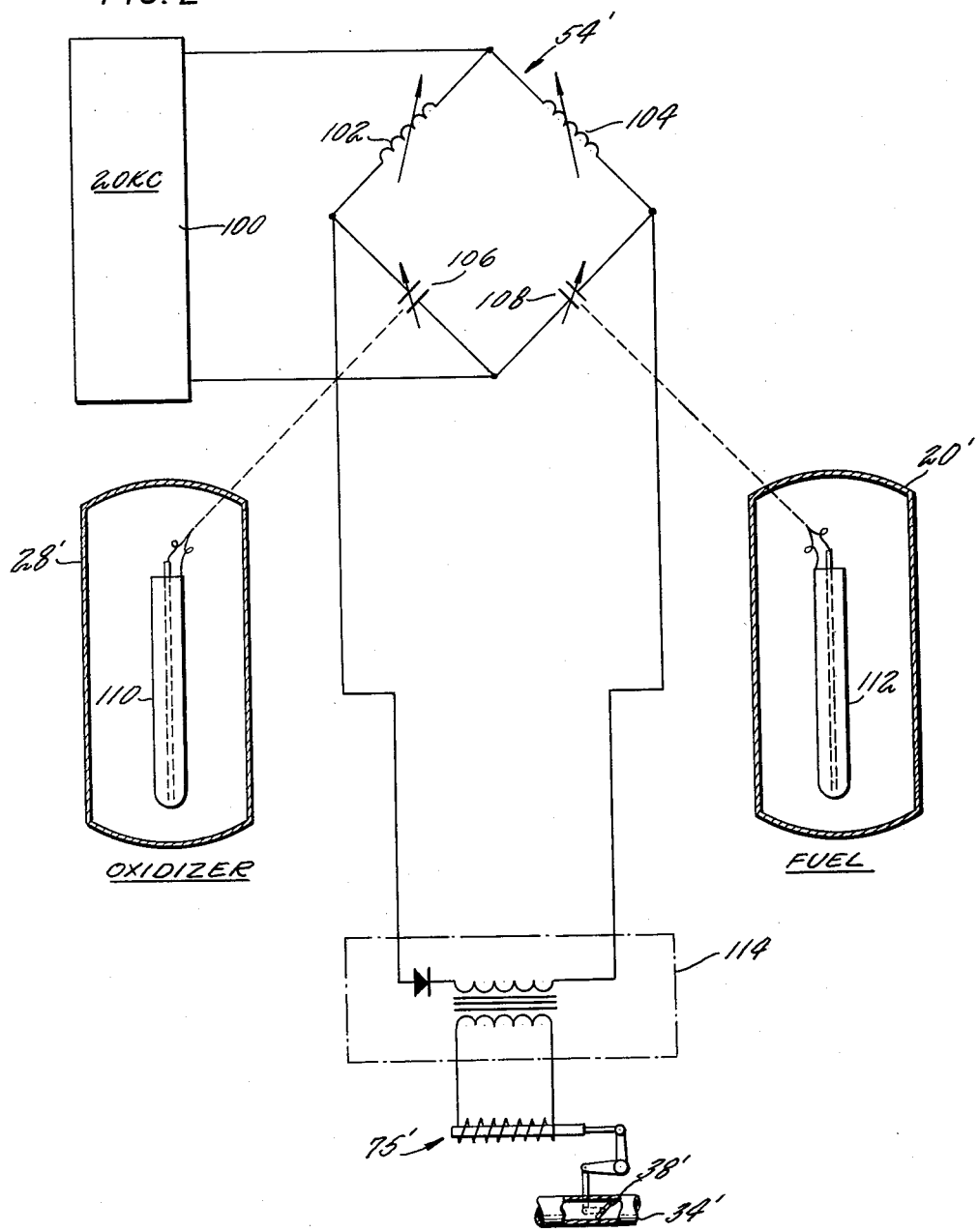
FIG. 2 is a schematic representation of my liquid rocket propellant utilization control employing a capacitance bridge circuit.

It will further be noted as shown in FIG. 2 that an electrical system utilizing capacitance instead of resistance may be used in my liquid rocket propellant utilization control.

FIG. 2 shows an impedance bridge circuit 54' which substitutes inductance and capacitance for the resistance circuit shown in FIG. 1. The bridge 54' is fed from a suitable oscillator, such as 20 kc. oscillator 100, and has inductances 102 and 104 substituted for the resistances 56 and 60 of FIG. 1. Capacitances 106 and 108 are substituted for the tank resistances 48 of FIG. 1 and are connected, respectively, to capacitance probes 110 and 112 in oxidizer tank 28' and fuel tank 20' so that bridge circuit 54' provides a signal to transformer 114 to actuate solenoid 75' and hence valve 38' in line 34'. Capacitance probes 110 and 112 are of the well-known variety including a hollow tube having a centrally mounted rod therein. This impedance type bridge circuit shown in FIG. 2 is illustrated and described more fully in the publication entitled Electronic Circuits and Tubes by the Electronics Training Staff of the Cruft Laboratory, Harvard University, published in 1947 in New York and London by the McGraw-Hill Company, Inc. It will be understood that while the Wheatstone bridge shown in FIG. 1 is of the resistance type and for use with direct current application, the impedance bridge, which uses inductance and capacitance as a substitute for the resistance of FIG. 1 and is shown in FIG. 2 is for use with alternating current applications.

*Operation*

Prior to liquid rocket operation, a quantity of fuel is placed in tank 20 and a quantity of oxidizer is placed into tank 28 so that, as near as possible, the ratio between the quantity of fuel and the quantity of oxidizer in their respective tanks is equal to the desired fuel-to-oxidizer ratio to be provided to combustion chamber 12. Further, trimmer resistance 60 is set such that the ratio between resistance 60 and resistance 56 is the desired fuel-to-oxidizer ratio and valve 38 is at midposition when there is no current flow through solenoid 75. When starter switch 46 actuates electrical motor 44, gear means 42 is caused to drive pumps 26 and 32 at speeds which will provide fuel and oxidizer to combustion chamber 12 at the desired fuel-to-oxidizer ratio. Now, if for some reason such as mechanical deficiencies in either of pumps 26 or 32 an excessive quantity of fuel is pumped to combustion chamber 12, fuel tank 20 will be emptied to too great an extent at any given time and hence temperature sensitive resistance elements 48 thereon will provide an increased resistance to line 50, unbalancing bridge circuit 54 and thereby causing current to flow from terminal 70 to terminal 72 and in the proper direction through solenoid coil 74 to open valve 38 and thereby increase the flow of oxidizer through conduit 30 to re-establish the desired fuel-to-oxidizer ratio. If, however, fuel is being provided to combustion chamber 12 at too slow a rate, the fuel remaining in tank 20 at any given time will be in excess of the proper amount so that the resistance imparted to line 50 by the tank 20 temperature responsive resistance elements 48 will be decreased to cause current flow through solenoid coil 74 in the opposite direction to close valve 38 and reduce the rate of oxidizer flow through conduit 30 to re-establish the desired fuel-to-oxidizer ratio. It will be obvious to one skilled in the art that bridge circuit 54 is performing the function of providing a resistance ratio to lines 50 and 52 proportional to the ratio of fuel and oxidizer remaining at any given time in tanks 20 and 28, respectively, and comparing this actual resistance ratio with the desired resistance ratio which exists in lines 62 and 58 to provide a resistance ratio error signal which is equal to fuel-to-oxidizer ratio error and which actuates solenoid plunger 76 and hence valve 38 to vary the flow of oxidizer through conduit 30 at a rate proportional to said resistance ratio error and hence re-establish the desired fuel-to-oxidizer ratio.

It is to be understood that the invention is not limited to the specific embodiment herein illustrated and described but may be used in other ways without departure from its spirit as defined by the following claims.

I claim:

1. In a liquid rocket having a combustion chamber, a fuel tank containing a selected quantity of fuel, an oxidizer tank containing a selected quantity of oxidizer, said selected fuel quantity and said selected oxidizer quantity defining a desired fuel-to-oxidizer ratio, first means including conduit means with pumps therein connecting said tanks to said combustion chamber to provide fuel and oxidizer to said combustion chamber in proportion to said ratio, fully electrical means to continually determine the quantities of fuel and oxidizer remaining in said tanks when said first means is in operation and to compare said fuel and oxidizer quantities so determined to said ratio to determine ratio error, said electrical means including a bridge circuit having a fixed resistance and a variable resistance set to define a resistance ratio equal to said desired feed-to-oxidizer ratio with said fixed resistance and volumes sensitive resistance elements attached to said tanks to provide resistance signals to said bridge circuit indicative of the ratio of the quantities of fuel and oxidizer remaining in said tanks for comparison with said resistance ratio to provide a ratio error signal and further having a solenoid actuated by said ratio error signal, and means including a variable area valve in said conduit means actuated by said solenoid to correct said first means as a function of said ratio error.

2. In a liquid rocket having a combustion chamber, a fuel tank containing a selected quantity of fuel, an oxidizer tank containing a selected quantity of oxidizer, said selected fuel quantity and said selected oxidizer quantity defining a desired fuel-to-oxidizer ratio, first means including first conduit means with a first pump therein connecting said fuel tank to said combustion chamber and second conduit means with a second pump therein connecting said oxidizer tank to said combustion chamber, drive means connecting said first and second pumps to control the outputs thereof to provide a pump output ratio equal to said desired fuel-to-oxidizer ratio to provide fuel and oxidizer to said combustion chamber, fully electrical means to continually determine the quantities of fuel and oxidizer remaining in said tanks when said first and drive means are in operation and to compare said fuel and oxidizer quantities so determined to said desired fuel-to-oxidizer ratio to determine desired fuel-to-oxidizer ratio error, said electrical means including a bridge circuit having a fixed resistance and a variable resistance set to define a resistance ratio equal to said desired fuel-to-oxidizer ratio with said fixed resistance and temperature sensitive resistance elements attached to said tanks to provide resistance signals to said bridge circuit indicative of the ratio of the quantities of fuel and oxidizer remaining in said tanks for comparison with said resistance ratio to provide a ratio error signal and further having a solenoid actuated by said ratio error signal, and means including a variable area valve in said second conduit means actuated by said solenoid to vary the area of said valve and hence the rate of oxidizer flow through said second conduit means as a function of said desired fuel-to-oxidizer ratio error.

3. In a liquid rocket having a combustion chamber, a fuel tank containing a selected quantity of fuel, an oxidizer tank containing a selected quantity of oxidizer, said selected fuel quantity and said selected oxidizer quantity defining a desired fuel-to-oxidizer ratio, first means including first conduit means with a first pump therein connecting said fuel tank to said combustion chamber and second conduit means with a second pump therein connecting said oxidizer tank to said combustion chamber, drive means connecting said first and second pumps to control the outputs thereof to provide a pump output ratio equal to said desired fuel-to-oxidizer ratio to provide fuel and oxidizer to said combustion chamber, fully electrical means to continually determine the quantities of fuel and oxidizer remaining in said tanks when said first and drive means are in operation and to compare said fuel and oxidizer quantities so determined to said desired fuel-to-oxidizer ratio to determine desired fuel-to-oxidizer ratio error, said electrical means including a bridge circuit having a fixed resistance and a variable resistance set to define a resistance ratio equal to said desired fuel-to-oxidizer ratio with said fixed resistance and temperature sensitive resistance elements attached to said tanks to provide resistance signals to said bridge circuit indicative of the ratio of the quantities of fuel and oxidizer remaining in said tanks for comparison with said resistance ratio to provide a ratio error signal and further having a solenoid actuated by said ratio error signal, means including a variable area valve in said second conduit means actuated by said solenoid to vary the area of said valve and hence the rate of oxidizer flow through said second conduit means as a function of said desired fuel-to-oxidizer ratio error, and means to bias said resistance ratio so that said valve is in substantially midposition when said desired fuel-to-oxidizer ratio error is zero.

4. In a liquid rocket having a combustion chamber, a fuel tank containing a selected quantity of fuel, an oxidizer tank containing a selected quantity of oxidizer, said selected fuel quantity and said selected oxidizer quantity defining a desired fuel-to-oxidizer ratio, first means including first conduit means with a first pump therein connecting said fuel tank to said combustion chamber and second conduit means with a second pump therein connecting said oxidizer tank to said combustion chamber, drive means connecting said first and second pumps to control the outputs thereof to provide a pump output ratio equal to said desired fuel-to-oxidizer ratio to provide fuel and oxidizer to said combustion chamber, fully electrical means to continually determine the quantities of fuel and oxidizer remaining in said tanks when said first and drive means are in operation and to compare said fuel and oxidizer quantities so determined to said desired fuel-to-oxidizer ratio to determine desired fuel-to-oxidizer ratio error, said electrical means including a bridge circuit having a fixed resistance and a variable resistance set to define a resistance ratio equal to said desired fuel-to-oxidizer ratio with said fixed resistance and temperature sensitive resistance elements attached to said tanks to provide resistance signals to said bridge circuit indicative of the ratio of the quantities of fuel and oxidizer remaining in said tanks for comparison with said resistance ratio to provide a ratio error signal and further having a solenoid actuated by said ratio error signal, means including a variable area valve in said second conduit means actuated by said solenoid to vary the area of said valve and hence the rate of oxidizer flow through said second conduit means as a function of said desired fuel-to-oxidizer ratio error, and means to bias said pump output ratio so that said valve is in substantially midposition when said desired fuel-to-oxidizer ratio error is zero.

5. In a liquid rocket having a combustion chamber, a fuel tank containing a selected quantity of fuel, an oxidizer tank containing a selected quantity of oxidizer, said selected fuel quantity and said selected oxidizer quantity defining a desired fuel-to-oxidizer ratio, first means including conduit means with pumps therein connecting said tanks to said combustion chamber to provide fuel and oxidizer to said combustion chamber in proportion to said ratio, fully electrical means to continually determine the quantities of fuel and oxidizer remaining in said tanks when said first means is in operation and to compare said fuel and oxidizer quantities so determined to said ratio to determine ratio error, said electrical means including a bridge circuit having a fixed impedance and a variable impedance set to define an impedance ratio equal to said desired fuel-to-oxidizer ratio with said fixed impedance and volume sensitive impedance elements attached to said tanks to provide impedance signals to said bridge circuit indicative of the ratio of the quantities of fuel and oxidizer remaining in said tanks for comparison with said impedance ratio to provide a ratio error signal and further having a solenoid actuated by said ratio error signal, and means including a variable area valve in said conduit means actuated by said solenoid to correct said first means as a function of said ratio error.

References Cited in the file of this patent

UNITED STATES PATENTS

| | | |
|---|---|---|
| 1,833,112 | Harrison | Nov. 24, 1931 |
| 2,354,964 | Ostermann et al. | Aug. 1, 1944 |
| 2,687,168 | Haviland | Aug. 24, 1954 |